United States Patent [19]
Reese

[11] 3,963,083
[45] June 15, 1976

[54] SNOWMOBILE CONSTRUCTION HAVING DRIVE BELT OFFSET FROM CENTER LINE OF SKI SPINDLES

[75] Inventor: Gerald D. Reese, Brooten, Minn.

[73] Assignee: Scorpion, Inc., Crosby, Minn.

[22] Filed: May 23, 1975

[21] Appl. No.: 580,298

[52] U.S. Cl. .................................. 180/5 R; 280/21 R
[51] Int. Cl.² ............................................. B62M 27/02
[58] Field of Search ................. 180/5 R, 9.38, 9.44; 305/44; 280/87 R, 95 R, 21 R, 21 A

[56] References Cited
UNITED STATES PATENTS 2,788,858   4/1957   Aasland ........................... 280/87 R
3,847,239   11/1974   Copeland ........................... 180/5 R Primary Examiner—M. H. Wood, Jr.
Assistant Examiner—John A. Carroll
Attorney, Agent, or Firm—Dugger, Johnson & Westman

[57] ABSTRACT

A snowmobile which is constructed in a unique manner to provide a tendency to oversteer to the left, which is the common direction for turns in oval track racing. The snowmobile is constructed so that the center line of the drive track is offset from the center line between the two steering ski spindles to create a moment about the center of drag of the steering skis and about the center of gravity which tends to turn the machine in a selected direction.

1 Claim, 3 Drawing Figures

U.S. Patent   June 15, 1976   3,963,083
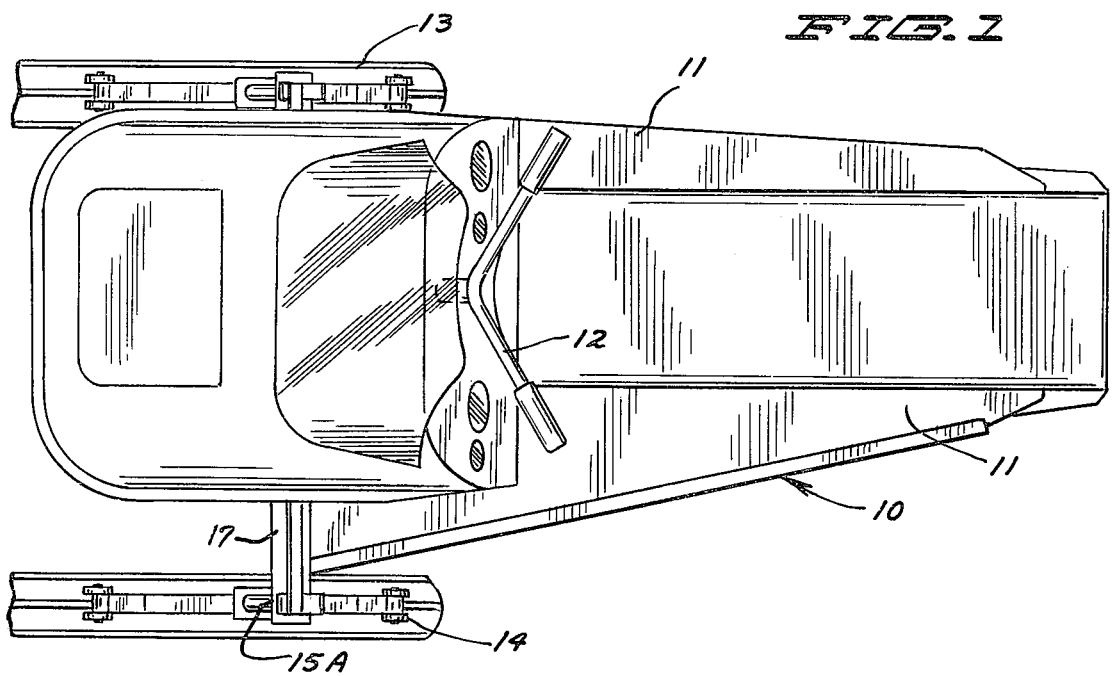
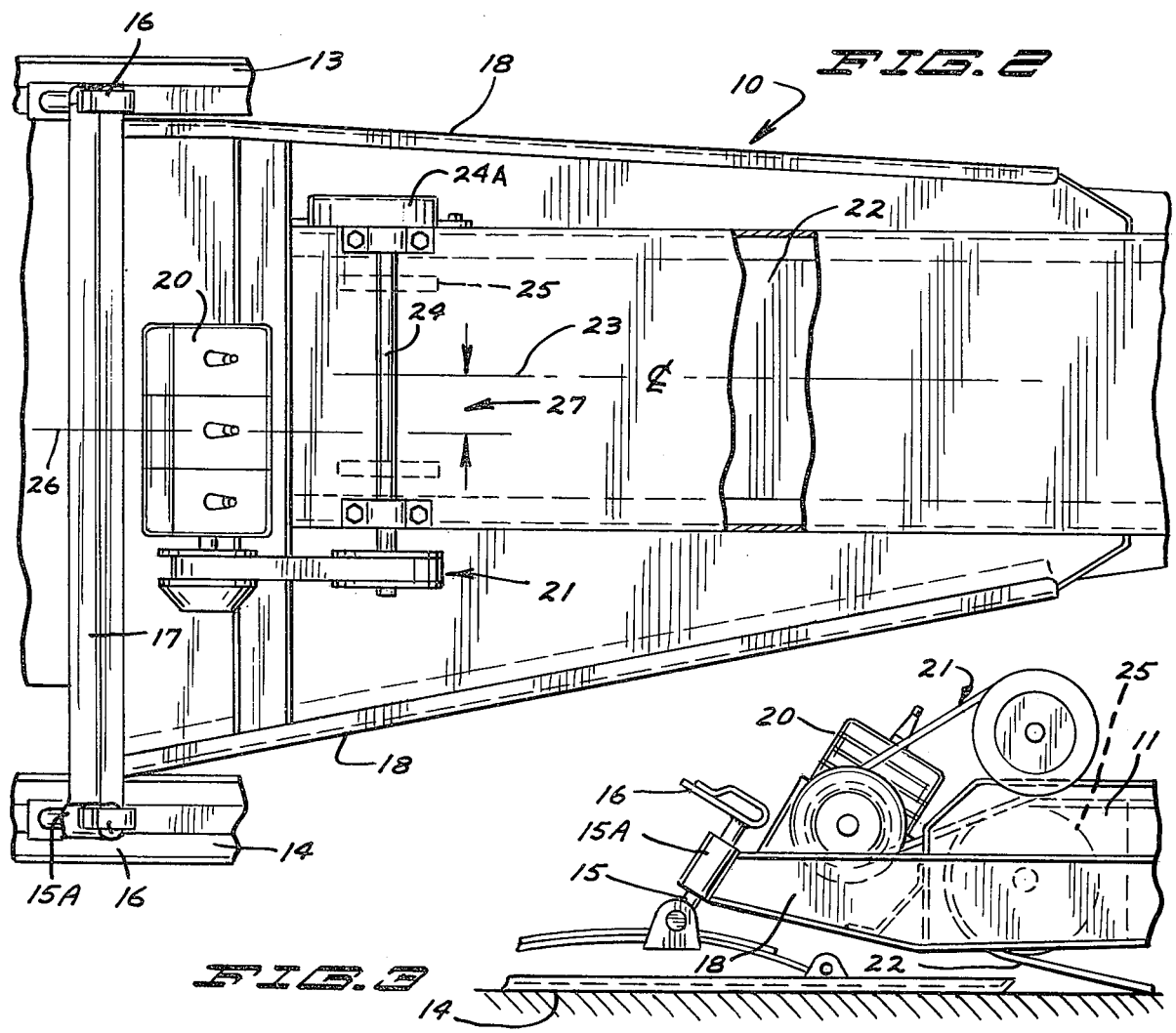

SNOWMOBILE CONSTRUCTION HAVING DRIVE BELT OFFSET FROM CENTER LINE OF SKI SPINDLES

BACKGROUND OF THE INVENTION

1. Field of the Invention

The present invention relates to the mounting of ski spindles on snowmobile frames so as to offset the center of thrust of the snowmobile drive track from the center of drag of the front turning skis and the center of gravity to make the snowmobile have a tendency to turn in a selected direction.

2. Prior Art

In the prior art there have been various attempts to tend to make a snowmobile oversteer in one direction or the other because of the difficulties involved in getting good steering during oval track races at high speeds. The concept of changing a steering ski position in order to obtain better cornering is well shown in the prior art, and is shown in U.S. Pat. No. 3,731,755, which relates to a transversely movable axle assembly that shifts the skis when steering. The principle object is to raise one ski and lower the other during turns, and the mounting is made to do this. The center lines of the ski spindles are not fixed, and a movable apparatus, which can wear and cause problems in operation is provided.

Skis which are offset from the center of the spindles for the steering skis are provided when a "ski spreader" is used. The ski spreader has been advertised and sold. The ski spreader basically is used to support the ski out to one side or the other of the spindle axis. Other devices which attempt to aid in turning include mechanisms to tilt the body of the snowmobile such as that shown in U.S. Pat. No. 3,777,831, for example in FIGS. 7 and 8. Cam members also have been used to extend one ski and retract the other during turns as shown in U.S. Pat. No. 3,550,706. However, all of these require relatively complex mechanisms for operation.

SUMMARY OF THE INVENTION

The present invention relates to a permanent installation whereby the steering axes of the spindles for the steering skis on a snowmobile are positioned so that the bisecting line between these axes is laterally offset from the center line of thrust from the drive belt of the snowmobile. The construction is rugged, easy to make, and provides a specialized machine that tends to turn more easily in one direction than the other, without complex apparatus for raising or lowering the skis, or transversely shifting the skis during use.

The arrangement provides a tendency to oversteer, as shown, to the left, which is the normal direction of turns in an oval track race but also can be made with a tendency to oversteer to the right if desired.

BRIEF DESCRIPTION OF THE DRAWINGS

FIG. 1 is a top plan view of a schematic representation of a snowmobile embodying the present invention;

FIG. 2 is a top plan schematic view of the ski mountings in relation to the drive track and tunnel of the snowmobile; and FIG. 3 is a fragmentary side view of the front portions of the frame of FIG. 2.

DESCRIPTION OF THE PREFERRED EMBODIMENTS

A snowmobile illustrated generally at 10 as shown has a main frame or chassis 11, a handlebar 12, which controls operation of steering skis 13 and 14. The skis as shown have spindles 15 mounted in tubes or hubs 15A, and have steering levers 16 at the upper ends thereof (see FIG. 3). The hubs 15A are mounted to ends of a cross axle 17 that is fixed to structural frame members 18 at the outer edges of the frame, in the form shown in the copending application of Gerald R. Irvine, Ser. No. 580,299, entitled Unitary Frame and Engine Support for Snowmobile filed May 23, 1975 on even date herewith.

An engine 20 can be mounted in a suitable manner and a drive train 21 can be used for driving a track 22 mounted in the usual manner over sprockets front and rear of the snowmobile. The chassis includes the normal inverted U tunnel for housing the track. The track has a center line indicated generally at 23. All of the individual components are well known, and the drive for the snowmobile also is well known. The mechanism is therefore shown only schematically for illustrative purposes. The drive train 21 can include a torque converter, and a drive belt leading from the engine 20 to a cross shaft indicated generally at 24. The cross shaft drives through a chain case 24A to drive a shaft carrying sprockets 25 shown in dotted lines for the drive track 22. A suitable drive arrangement is shown in U.S. Pat. No. 3,776,354.

The bisecting plane extending in fore and aft direction between the ski spindle center lines is indicated at 26 in FIG. 2. This bisecting plane is laterally offset from the longitudinally extending center line 23 of the drive track 22 by an amount indicated at 27. The bisecting plane 26 between the ski spindles is offset to the left of the center line 23 of the drive track. Assuming that the center of drag of the skis is along the bisecting plane 26 between the ski spindles, which is conventional in the form shown, the thrust or drive force along the center line 23 of the drive track tends to create a moment about the center line of the drag of the front skis tending to turn the snowmobile to the left.

The shifting of the front axle shifts the location or points where the skis support the forward end of the snowmobile and thus, as described the construction also causes a shift of the center of gravity of the machine laterally from the center line of the drive belt. Thus thrust creates a moment about the center of gravity tending to turn the snowmobile.

The amount of offset shown at 27 can be as desired to achieve the results wanted but preferably it will range generally without completely destroying the ability to turn the vehicle in the opposite direction between 2 and 6 inches, for adequate oversteering action.

Of course it is apparent that the axle 17 could be moved so that the fore and aft extending bisecting plane 26 between the ski spindle axes was to the right of the longitudinal center line 23 of the drive belt to tend to oversteer to the right. The machine shown will not steer as well to the right as it will to the left, but it is designed primarily for racing where the turns will be to the left at the normal oval track race configuration at the present time.

In this way, a relatively low cost modification can be made for a permanent racing machine without the need for shifting axles, expensive cams, and without the use of the ski spreaders which tend to reduce the prompt steering response necessary for control during a race.

What is claimed is:

1. A snowmobile construction for a snowmobile requiring turning at high rates of speed, said construction providing a tendency to turn in one direction or the other when at high speed including a frame, an endless traction drive belt engaging a supporting surface and driving said snowmobile, said drive belt having a longitudinally extending center line, steering means at the forward end of the snowmobile comprising a pair of skis spaced apart from each other and supporting the forward ends of said snowmobile, a cross axle fixed to said frame at the forward end thereof, a pair of separate supports each having a pivot support, each of said supports being fixed to said cross axle at opposite ends thereof, means to mount said skis respectively to said supports for steering movement about the axis of the pivot of the supports, said cross axle and supports being nonadjustably fixed together and to the frame in position so that the bisecting plane between said pivot axes of said supports and the longitudinal center line of said drive belt are offset sufficiently to create a steering moment in one direction when the snowmobile is being turned at substantial speeds.

* * * * *